Dec. 17, 1968    F. T. IRGENS    3,416,578
CHAIN SAW BAR
Filed Oct. 4, 1966
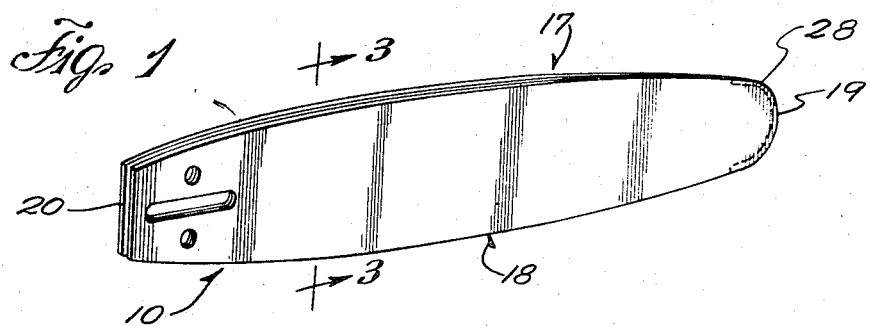
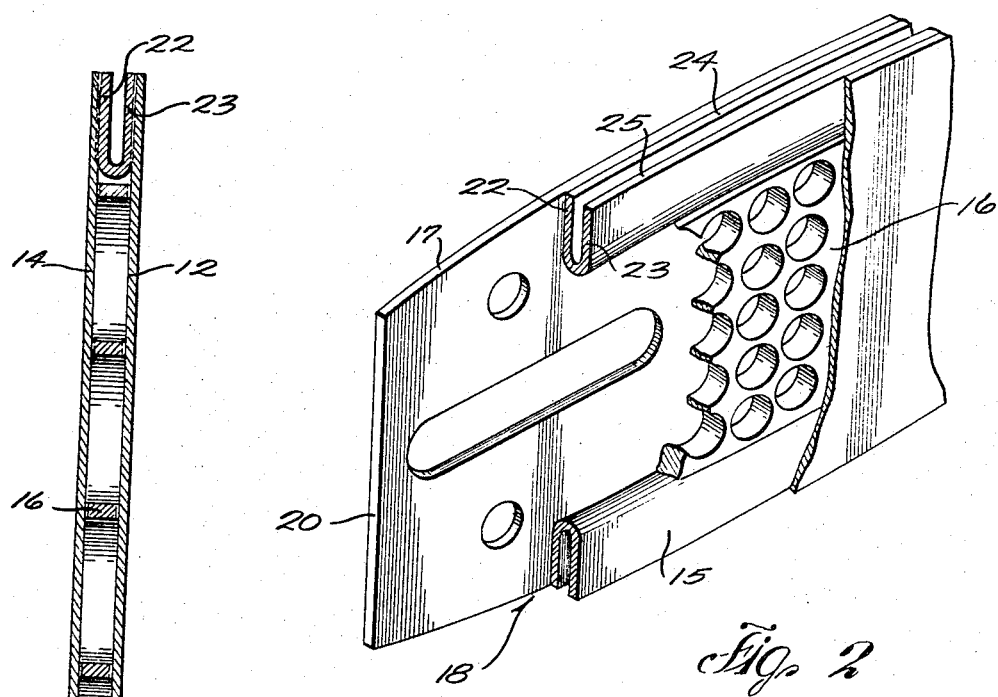
Inventor
Finn T. Irgens
Wheeler, Wheeler, House & Clemency
Attorneys

United States Patent Office 3,416,578
Patented Dec. 17, 1968

3,416,578
CHAIN SAW BAR
Finn T. Irgens, Milwaukee, Wis., assignor to Outboard Marine Corporation, Waukegan, Ill., a corporation of Delaware
Filed Oct. 4, 1966, Ser. No. 584,260
4 Claims. (Cl. 143—32)

Since chain saws are manually operated, the weight of the chain saw unit is of considerable significance from the standpoint of operator convenience and as a competitive sales factor. A heavy chain saw becomes tiresome to operate over extended periods, thereby increasing the risk of harm to the operator.

A substantial proportion of the weight of a chain saw is contributed by the chain saw bar which carries and guides the cutting chain.

The weight of previous chain saw bars is due in part to the relatively heavy side plates previously employed in the typical three piece laminated bar which consists of an inner plate sandwiched between two larger substantially identical outer plates having a corresponding outline but larger area than the inner plate. This construction provides the channel in which the saw links are guided. The outer side plates have previously been of relatively heavy gauge to provide a rigid structure which is not subject to warping or distortion resulting from pinching or twisting of the saw bar while cutting timber.

The present invention eliminates such previous heavy side plates while affording the desired strength and rigidity by use of a channel shaped member as a guide for the chain links. In accordance with the invention the channel shaped member is generally U-shaped having parallel sides and is sandwiched between two side plates which have substantially less thickness and weight than the previous side plates. The channel shaped member can be a single piece providing a continuous guide around the perimeter of the chain saw bar.

Use of the channel shaped member in a chain saw bar having brazed joints eliminates any stresses which act on the brazed joints of a conventional laminated cutter bar and which are caused by wedging action of the chain, which action tends to separate the laminations. In the chain saw bar of the present invention these stresses are contained in the channel member.

Additional rigidity is provided by an inner steel spacer that can be perforated or honeycombed to minimize weight.

Further objects and advantages of the invention will become apparent from the following description and accompanying drawings in which:

FIGURE 1 is a side and end perspective view of a chain saw bar embodying various of the features of the present invention.

FIGURE 2 is an enlarged perspective view with one outer plate partially removed showing the chain saw bar illustrated in FIGURE 1 in fragmentary section.

FIGURE 3 is a sectional end view of the chain saw bar shown in FIGURE 1 taken along line 3—3.

Referring now to the drawings there is illustrated in FIGURE 1 a chain saw bar 10 which includes two side plates 12 and 14, a U-shaped channel member 15, and a spacer 16. The chain saw bar is adapted for use with a conventional chain saw powerhead. The chain linkage and powerhead form no part of the present invention and accordingly are not illustrated or described.

The two side plates 42 and 14 are identical in dimension and area, each having an arcuate upper edge 17 and an arcuate lower edge 18, an outer curvilinear end portion 19, and a flat inner end portion 20 adapted for mounting on a powerhead.

The U-shaped channel member 15 has spaced apart and parallel side walls 22 and 23 with respective outer edges 24 and 25 which are flush with and adjacent to the side plate edges 17 and 18. The bight or web of the channel member may be arcuate in cross section as shown in FIGURE 3 or may be perpendicular to the side plates. The channel shaped member 15 may be constructed of one or two pieces with the ends welded or otherwise secured to form a single piece to provide a continuous guide for the chain saw around the perimeter of the bar. The use of the channel shaped member 15 provides the necessary rigidity to prevent pinching of the chain links by the bar 10 when the saw is in use and permits the use of steel side plates 12 and 14 of substantially lesser thickness than have been previously employed. For example, a conventional cutter bar may have steel side plates of .050 inch thickness with an inner plate also of .050 inch thickness. In the disclosed construction the side plates 12 and 14 can be of .025 inch thickness and the side walls can be .025 inch thickness with an intervening channel or slot of .050 inch thickness whereby the total width of the channel shaped member is .100 inch. Accordingly, the overall thickness of the cutter 10 will be the same, i.e., .150 inch. As the side plates of a chain saw bar constitute a major portion of the weight of the entire unit, the weight of the chain saw bar is accordingly substantially reduced.

The spacer 16 provides additional rigidity to the chain saw bar and can be perforated as shown in FIGURE 2, or honeycombed to decrease overall weight. The spacer can be of a dimension to abut and support the bight of the U-shaped channel member 15, or it can be separated from the U-shaped channel member as shown in FIGURE 3. However, abutment with the channel shaped member 15 by the spacer 16 assists in positioning the channel shaped member with respect to the side plates while assembling the chain saw bar.

The side plates 12 and 14 are desirably copper brazed to the channel member and spacer 16 using a process such as that disclosed in Patent No. 3,119,418.

A wear resisting material 28, such as Stellite, a trademark of the Haynes Stellite Co., can be welded to the end portion 19 of the side plates 17 and 18 to afford wear resistance to the chain saw bar.

Various features of the invention are set forth in the following claims:

What is claimed is:
1. A chain saw bar comprising two side plates, a channel shaped member mounted between said plates, and a spacer mounted between said side plates inwardly of said channel shaped member said channel shaped member having two parallel spaced apart side walls located between said side plates.
2. A chain saw bar in accordance with claim 1 wherein said side plates have outer edges and said side walls have outer edges flush with said side plate edges.

3. A chain saw bar in accordance with claim 1 wherein said spacer is perforated.

4. A chain saw bar comprising two side plates having outer edges, a channel shaped member being generally U-shaped in cross section and having an arcuate bight and two parallel spaced apart side walls with outer edges and wherein the outer edges of said side plates are flush with the outer edges of said side walls, and a spacer mounted between said side plates inwardly of said channel shaped member, said spacer being perforated and in abutment with said channel shaped member.

References Cited

UNITED STATES PATENTS 2,897,856   8/1959   Carlton.
2,948,309   8/1960   Hoff et al.
2,962,812   12/1960   Gommel _____ 29—463

DONALD R. SCHRAN, *Primary Examiner.*

U.S. Cl. X.R.

29—463.